(12) United States Patent
Goto et al.

(10) Patent No.: US 9,234,284 B2
(45) Date of Patent: Jan. 12, 2016

(54) ELECTRICAL DISCHARGE SURFACE TREATMENT METHOD

(75) Inventors: Akihiro Goto, Chiyoda-ku (JP);
Kazushi Nakamura, Chiyoda-ku (JP);
Masahiro Okane, Chiyoda-ku (JP);
Hiroyuki Teramoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1091 days.

(21) Appl. No.: 13/057,715

(22) PCT Filed: Aug. 6, 2008

(86) PCT No.: PCT/JP2008/064149
§ 371 (c)(1),
(2), (4) Date: Feb. 4, 2011

(87) PCT Pub. No.: WO2010/016121
PCT Pub. Date: Feb. 11, 2010

(65) Prior Publication Data
US 2011/0135845 A1   Jun. 9, 2011

(51) Int. Cl.
*C23C 26/02*   (2006.01)
*B23H 1/00*   (2006.01)
*B23H 1/06*   (2006.01)
(Continued)

(52) U.S. Cl.
CPC   *C23C 26/02* (2013.01); *B23H 1/00* (2013.01);
*B23H 1/06* (2013.01); *B23H 1/08* (2013.01);
*B23H 9/00* (2013.01); *C25D 3/66* (2013.01);
*C25D 5/18* (2013.01)

(58) Field of Classification Search
CPC ........ C23C 26/00; C23C 24/00; C23C 26/02; C23D 5/18
See application file for complete search history.

(56) References Cited

U.S. PATENT DOCUMENTS 5,858,479 A * 1/1999 Saito et al. .................... 427/580
6,365,008 B1 4/2002 Goto et al.
(Continued)

FOREIGN PATENT DOCUMENTS

CN   1286733 A   3/2001
CN   1798871 A   7/2006
(Continued)

OTHER PUBLICATIONS

Chinese Office Action dated Jul. 3, 2012 issued in Chinese Application No. 200880136981.
(Continued)

*Primary Examiner* — Joel Horning
(74) *Attorney, Agent, or Firm* — Sughrue Mion, PLLC; Richard C. Turner

(57) ABSTRACT

An electrical discharge surface treatment method for forming a coating film by generating a pulsed electrical discharge between an electrode and a workpiece in working fluid or gas using a green compact obtained by molding metal powder or metal alloy powder or a molded body obtained by heating the green compact as the electrode, and by melting an electrode material by an energy of the pulsed electrical discharge, forming a coating of the electrode material or a coating of a material obtained by a reaction of the electrode material by the energy of the pulsed electrical discharge on a surface of the workpiece, the electrical discharge surface treatment method includes generating the pulsed electrical discharge by mixing together two or more types of pulsed electrical discharges having different energies.

10 Claims, 14 Drawing Sheets

(51) Int. Cl.
*B23H 1/08* (2006.01)
*B23H 9/00* (2006.01)
*C25D 3/66* (2006.01)
*C25D 5/18* (2006.01)

(56) References Cited

U.S. PATENT DOCUMENTS

| | | | |
|---|---|---|---|
| 6,492,611 B2 * | 12/2002 | Goto et al. | 219/69.17 |
| 6,501,232 B1 * | 12/2002 | Goto et al. | 315/291 |
| 6,602,561 B1 | 8/2003 | Goto et al. | |
| 6,929,829 B2 * | 8/2005 | Mohri et al. | 427/540 |
| 7,834,291 B2 | 11/2010 | Goto et al. | |
| 2005/0211165 A1 | 9/2005 | Goto et al. | |
| 2006/0086617 A1 | 4/2006 | Goto et al. | |
| 2006/0118402 A1 | 6/2006 | Goto et al. | |

FOREIGN PATENT DOCUMENTS

| | | |
|---|---|---|
| JP | 05-148615 A | 6/1993 |
| JP | 09-192937 A | 7/1997 |
| JP | 3227454 B2 | 8/2001 |
| JP | 2004-255517 A | 9/2004 |
| JP | 2005-213554 A | 8/2005 |
| JP | 2006-124741 A | 5/2006 |
| JP | 2006-257556 A | 9/2006 |
| WO | 2004/011696 A1 | 2/2004 |
| WO | 2004/111305 A1 | 12/2004 |

OTHER PUBLICATIONS

Goto, Akihiro, et al., "Formation of Thick Layer by Electrical Discharge Coating (EDC)." Die and Mould Technology, 1999, vol. 14, No. 7.

\* cited by examiner

ELECTRICAL DISCHARGE SURFACE TREATMENT METHOD

TECHNICAL FIELD

The present invention relates to an electrical discharge surface treatment method for forming a dense coating film by electrical discharge surface treatment of generating a pulsed electrical discharge between an electrode and a workpiece in working fluid or gas using a green compact obtained by molding metal powder or metal alloy powder or a molded body obtained by heating the green compact, and by melting an electrode material by an energy of the pulsed electrical discharge, forming a coating of the electrode material or a coating of a material obtained by a reaction of the electrode material by the discharge energy on a surface of the workpiece.

BACKGROUND ART

A technique for enhancing corrosion resistance and wearing resistance by coating a surface of a metal material by a submerged electrical discharge processing method is heretofore known. An example of the technique is as follows. For example, a method has been disclosed in which a pulsed electrical discharge is performed in working fluid with an electrode obtained by compression molding a mixture of fine particles of WC (tungsten carbide) and Co (cobalt) to deposit the electrode material on a workpiece, and thereafter re-melt discharge processing is performed with another electrode (for example, a copper electrode or a graphite electrode) to obtain even higher hardness and enhanced adhesion (see, for example, Patent Document 1). In Patent Document 1, electrical discharge processing is performed on a workpiece (a base material S50C) in working fluid using a WC—Co mixed green compact electrode to deposit the WC—Co on the workpiece (primary processing), and subsequently, re-melt processing (secondary processing) is performed using an electrode that is not relatively susceptible to wearing, such as a copper electrode. As a result, although the deposited structure has a hardness (Vickers hardness Hv) of about Hv=1410 with a considerable amount of voids after the primary processing, the voids of the coating layer disappear with enhanced hardness of Hv=1750 by the secondary processing of the re-melt processing. With this method, a coating layer having a great hardness with enhanced adhesion is obtained for steel as the workpiece.

However, with the above method, it is not possible to form a coating layer having robust adhesion on a surface of a sintered material, such as cemented carbide, as the workpiece. In regard to this point, researches performed by present inventors have shown that a robust hard coating can be formed on a metal surface of a workpiece without performing the re-melt processing by generating electrical discharge between an electrode and the workpiece, using a material such as Ti (titanium), which forms hard carbide, as the electrode. This is because the electrode material worn by the electrical discharge and C (carbon) in the working fluid react with each other, and as a result, TiC (titanium carbide) is produced.

Furthermore, a technique has been disclosed in which a hard coating film can be formed with good adhesion faster than a case of using materials such as Ti and the like by generating electrical discharge between a workpiece and an electrode by using a green compact obtained from a metal hydride such as $TiH_2$ (titanium hydride) as the electrode (see, for example, Patent Document 2). In addition, another technique has been disclosed in which a hard coating film having properties of hardness, wearing resistance and the like is formed in a rapid manner by generating electrical discharge between a workpiece and an electrode by using a green compact obtained from a mixture of the metal hydride such as $TiH_2$ and the like and metal or ceramic.

Further, still another technique has been disclosed in which an even stronger surface treatment electrode can be manufactured by pre-sintering (see, for example, Patent Document 3). That is, when manufacturing an electrical-discharge surface-treatment electrode made of a mixed powder of the WC powder and the Co powder, although a green compact can be obtained by simply compression molding the mixture of the WC powder and the Co powder, if it is compression molding after mixing wax, the molding property of the green compact is enhanced. In this case, because the wax is a dielectric material, when a considerable amount of wax remains in the electrode, an electrical resistance of the electrode increases, resulting in degradation of the discharge property. Therefore, the green compact electrode is heated in a vacuum furnace to remove the wax.

At this time, when the heating temperature is too low, the wax is not completely removed, and when the heating temperature is too high, the wax turns into soot, which degrades purity of the electrode. Therefore, the heating temperature needs to be maintained between a temperature at which the wax is melted or higher and a temperature lower than the wax is dissolved to turn into the soot. By heating the green compact in the vacuum furnace using a high-frequency coil and the like, it is baked until it has a hardness of about, for example, a chalk, and giving a strength to resist a machining process, paying attention not to harden excessively. This state is referred to as a pre-sintering state. In this case, although a bonding is progressed in an area of contact between carbides in the green compact, the bonding is weak because the sintering temperature is relatively low not reaching regular sintering. It has been proved that a dense and homogeneous coating film can be formed by performing electrical discharge surface treatment using an electrode formed in the above manner.

However, the conventional techniques described above need a further improvement because, although they are featured in points of the hardness and adhesion of the coating film, the wearing resistance and the swiftness of forming the coating film, and the density and homogeneity of the coating film, all the techniques fail to obtain sufficient thickness of the coating film.

A common technique for obtaining a thick coating film is so-called welding/thermal spraying. The welding (which means cladding by welding in this context) is a method of depositing a material of a welding electrode on a workpiece by melting the welding electrode with electrical discharge between them. The thermal spraying is a method of forming a coating film on a workpiece by melting a metal material and spraying it onto the workpiece. Because both methods are done by a human, requiring a skilled workforce, it is difficult to make the work a line operation, having a disadvantage of high manufacturing cost. Particularly, because the welding is a method in which the heat is applied to the workpiece in a concentrated manner, it causes a problem that a weld cracking occurs and a yield rate is low when processing a thin or fragile material.

Although it is described that a thick coating film of about 3 millimeters has been obtained using a WC—Co (9:1) electrode in electrical discharge surface treatment in a document based on the researches conducted by the present inventors (see Nonpatent Literature 1), it does not reach a level that can be practically applicable because of problems that the reproduction of the coating film is difficult because the formation of the coating film is unstable, the coating film is brittle having a considerable amount of voids although it is seemingly dense with a metallic gloss, and the coating film is so weak that it is removed when it is scratched hard with a metal piece and the like.

Subsequent researches have shown that a dense and thick coating film can be formed by electrical discharge surface treatment by mixing a predetermined amount or more of a metal material that does not form carbide or hardly forms carbide in the electrode material. That is, a thick coating film can be formed by increasing materials such as Co (cobalt), Ni (nickel), and Fe (iron) in the electrode material, reaching a level that can be practically applicable as a thick coating film (see Patent Document 4).

Patent Document 1: Japanese Patent Application Laid-open No. H5-148615
Patent Document 2: Japanese Patent Application Laid-open No. H9-192937
Patent Document 3: Japanese Patent No. 3227454
Patent Document 4: International Publication No. WO 04/011696 pamphlet
Nonpatent Literature 1: Technique of "Formation of Thick Layer by Electrical Discharge Coating (EDC)" Akihiro GOTO et al., (1999), THE NIKKAN KOGYO SHIMBUN, LTD.

DISCLOSURE OF INVENTION

Problem to be Solved by the Invention

Although a method of forming a thick coating film by electrical discharge surface treatment is disclosed as described above, because the electrical discharge surface treatment is a method of depositing a film in units of energy of a pulse using a fine pulsed electrical discharge, there is a problem that the coating material (electrode material) is not completely melted, so that a discontinuous portion caused by the pulsed electrical discharge remains. For example, a phenomenon that a bonding strength at a boundary of a portion where the coating material (electrode material) is melted by the pulsed electrical discharge is weak or a phenomenon that a portion between depositions of the coating material (electrode material) melted by the pulsed electrical discharge remains as a void occurs. Therefore, in terms of forming a dense and thick coating film by the electrical discharge surface treatment, an improvement is still required.

The present invention has been achieved in view of the above circumstances, and an object of the present invention is to obtain an electrical discharge surface treatment method that can form a dense and thick coating film in a stable manner in electric discharge surface treatment in which a pulsed electrical discharge is generated between an electrode and a workpiece and the electrode material is melted by an energy of the pulsed electrical discharge to form a coating film on the workpiece.

Means for Solving the Problem

An electrical discharge surface treatment method for forming a coating film by generating a pulsed electrical discharge between an electrode and a workpiece in working fluid or gas using a green compact obtained by molding metal powder or metal alloy powder or a molded body obtained by heating the green compact as the electrode, and by melting an electrode material by an energy of the pulsed electrical discharge, forming a coating of the electrode material or a coating of a material obtained by a reaction of the electrode material by the energy of the pulsed electrical discharge on a surface of the workpiece, the electrical discharge surface treatment method includes generating the pulsed electrical discharge by mixing together two or more types of pulsed electrical discharges having different energies, and each of the two or more types of pulsed electrical discharges has different energies from each other.

Effect of the Invention

According to the present invention, it is possible to form a dense and thick coating film by electrical discharge surface treatment in a stable manner.

BRIEF DESCRIPTION OF DRAWINGS

FIG. 3-1 is a graph of an example of a pulse condition for electrical discharge at the time of electrical discharge surface treatment, and depicts a voltage waveform of an inter-electrode voltage applied between an electrode and a workpiece at the time of electrical discharge.

FIG. 3-2 is a graph of an example of a pulse condition for electrical discharge at the time of electrical discharge surface treatment, and depicts a current waveform of a discharge current flowing at the time of electrical discharge.

FIG. 4-1 is a graph of another example of a pulse condition for electrical discharge at the time of electrical discharge surface treatment, and depicts a voltage waveform of an inter-electrode voltage applied between the electrode and the workpiece at the time of electrical discharge.

FIG. 4-2 is a graph of another example of a pulse condition for electrical discharge at the time of electrical discharge surface treatment, and depicts a current waveform of a discharge current flowing at the time of electrical discharge.

FIG. 5-1 is a cross-sectional image of a state of a coating film taken by a scanning electron microscope (SEM).

FIG. 5-2 is a cross-sectional image of a state of a coating film taken by the SEM.

FIG. 5-3 is a cross-sectional image of a state of a coating film taken by the SEM.

FIG. 5-4 is a cross-sectional image of a state of a coating film taken by the SEM.

FIG. 5-5 is a cross-sectional image of a state of a coating film taken by the SEM.

FIG. 6-1 is a cross-sectional image of a state of a coating film taken by an SEM when a pulse width te of a discharge pulse is set to 4 microseconds.

FIG. 6-2 is a cross-sectional image of a state of a coating film taken by the SEM when the pulse width te of a discharge pulse is set to 4 microseconds.

FIG. 7-1 is a schematic diagram for explaining a mechanism for forming a coating film by an electrical discharge surface treatment method according to a first embodiment.

FIG. 7-2 is a schematic diagram for explaining a mechanism for forming a coating film by the electrical discharge surface treatment method according to the first embodiment.

FIG. 10-1 is a graph of an example of a pulse condition for electrical discharge at the time of electrical discharge surface treatment, and depicts a voltage waveform of an inter-electrode voltage applied between an electrode and a workpiece at the time of electrical discharge.

FIG. 10-2 is a graph of an example of a pulse condition for electrical discharge at the time of electrical discharge surface treatment, and depicts a current waveform of a discharge current flowing at the time of electrical discharge.

FIG. 12-1 is a graph of an example of a pulse condition for electrical discharge at the time of electrical discharge surface treatment, and depicts a voltage waveform of an inter-electrode voltage applied between an electrode and a workpiece at the time of electrical discharge.

FIG. 12-2 is a graph of an example of a pulse condition for electrical discharge at the time of electrical discharge surface treatment, and depicts a current waveform of a discharge current flowing at the time of electrical discharge.

FIG. 13-1 is a cross-sectional image of a state of a coating film taken by an SEM.

FIG. 13-2 is a cross-sectional image of a state of a coating film taken by the SEM.

EXPLANATIONS OF LETTERS OR NUMERALS

Figure 1:
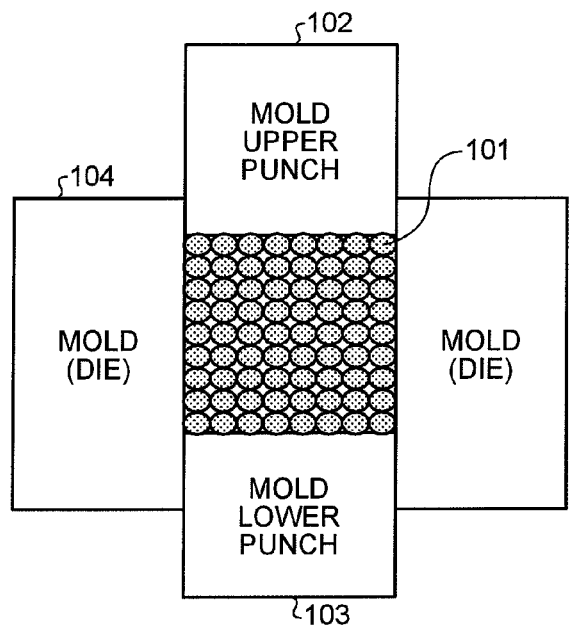
FIG. 1 is a schematic diagram for explaining a process for molding an electrode (a compressed body electrode) constituted by a compressed body.

101 Co alloy powder
102 Mold upper punch
103 Mold lower punch
104 Mold die
201 Electrode
202 Workpiece (member to be processed)
203 Working fluid
204 Electrical-discharge surface-treatment power supply
205 Electrical-discharge arc column

BEST MODE(S) FOR CARRYING OUT THE INVENTION

Exemplary embodiments of an electrical discharge surface treatment method according to the present invention will be explained below in detail with reference to the accompanying drawings. The present invention is not limited to the following descriptions and may be appropriately changed without departing from the scope of the invention. In the drawings illustrated below, the scale of respective members may be different from those of actual products for the sake of understanding. The same applies between the scales of the drawings.

First Embodiment

The present invention relates to an electrical discharge surface treatment method for forming a dense coating film by electrical discharge surface treatment of generating a pulsed electrical discharge between an electrode and a workpiece in working fluid or gas using a green compact obtained by molding metal powder or metal alloy powder or a molded body obtained by heating the green compact, and by melting an electrode material by an energy of the pulsed electrical discharge, forming a coating of the electrode material or a coating of a material obtained by a reaction of the electrode material by the discharge energy on a surface of the workpiece. As a result of further researches conducted by the present inventors on the above problems, it has been proved that a dense and thick coating film can be formed by reducing a discontinuous portion in the coating film by mixing a pulsed electrical discharge with a different energy when performing electrical discharge surface treatment.

With the conventional techniques, there has been a limit in the density of the coating film because the same electrical discharge pulse (discharge pulse) is generally used in a repeated manner when depositing the coating film. This is because the discharge pulse needs to play two roles, a first role is supplying the electrode material to the workpiece side by breaking the electrode and a second role is melting the electrode material supplied to the workpiece side. However, the researches conducted by the present inventors have proved that a dense and thick coating film may be formed by generating mixed discharge pulses of a discharge pulse that plays a role of breaking the electrode material and uniformly supplying the broken electrode material to the workpiece side and a discharge pulse that plays a role of well melting the electrode material supplied to the workpiece side by changing the energy of the discharge pulse when performing the electrical discharge surface treatment.

Although the role of the discharge pulse has been mentioned, this does not mean that the discharge pulse only plays its corresponding role, but the electrode material supplied to the workpiece side is melted enough even with the discharge pulse that plays the role of breaking the electrode material and supplying it to the workpiece side. Likewise, the electrode material is broken and supplied to the workpiece side even with the discharge pulse having the role of melting the electrode material supplied to the workpiece side.

In addition, the type of the discharge pulse having different energy is not limited to two types, but by mixing two or more types of discharge pulses having different energies, a dense and thick coating film may be formed as described above.

When forming a coating film by performing the electrical discharge surface treatment by the pulsed electrical discharge, a state of the coating film to be formed widely varies according to how the electrode material is supplied to the workpiece side and how the electrode material supplied to the workpiece side is melted. Two major factors that determine the state of the coating film are property of the electrode and condition of the electrical discharge. Provided the property of the electrode, that is, characteristics of the electrode determined by the material and manufacturing condition is constant, an influence on the coating film when the condition of the electrical discharge is changed is explained below.

An electrode in a tentatively sintered state obtained by, for example, molding a Co (cobalt) alloy having a particle diameter of about 1 micrometer and heating the molded Co alloy is used as the electrode. The tentatively sintered state means that the strength is enhanced by heating compared to a state of molding the powder, but it does not reach a state where the powder is melted and integrated.

FIG. 1 is a schematic diagram for explaining a process for molding an electrode (a compressed body electrode) constituted by a compressed body obtained by compression molding a powder of the Co alloy. In the process of molding the compressed body electrode, a mixed material obtained by mixing a Co (cobalt) alloy powder 101 having a particle diameter of about 1 to 2 micrometers and a wax (2 to 10 weight %) for improving the moldability is filled in a space surrounded by a mold upper punch 102, a mold lower punch 103, and a mold die 104. Subsequently, a green compact is formed by compression molding the mixed material by applying a press pressure of about 150 MPa. This green compact is then heated at a temperature ranged from 600° C. to 800° C. to increase the strength of the green compact itself and to remove the wax mixed in the mixed material. However, an appropriate heating temperature depends on the powder material, the particle diameter, and the press pressure applied at the compression. In general, the appropriate heating temperature exists in a temperature range from 500° C. to 900° C. A composition ratio of the alloy in the Co alloy powder is "25 weight % of Cr (chrome), 10 weight % of Ni (nickel), 7 weight % of W (tungsten), and the rest of Co (cobalt)".

In the electrical discharge surface treatment process, this green compact is used as the electrical discharge electrode (green compact electrode). Because this material is excellent in the corrosion resistance and in the hardness at high temperature, it is generally coated on a portion where these properties are required by a welding or the like, so that it is suitable for a coating process in which the corrosion resistance and the hardness at high temperature are required. If an application is only for forming a thick coating film for a repair of a part or the like, without requiring such functions as the corrosion resistance and the hardness at high temperature, it is also possible to form the thick coating film by using a green compact manufactured from only the powders of Co (cobalt), Ni (nickel), Fe (iron) and the like as the electrode.

By using a green compact electrode that contains equal to or higher than 40 volume % of a metal material that does not form carbide or hardly forms carbide with reference to Cr in an Ellingham diagram as the electrode material, it is possible to form a dense and thick coating film. The above described metal material includes Co (cobalt), Ni (nickel), Fe (iron), W (tungsten), and Mo (molybdenum).

Figure 2:
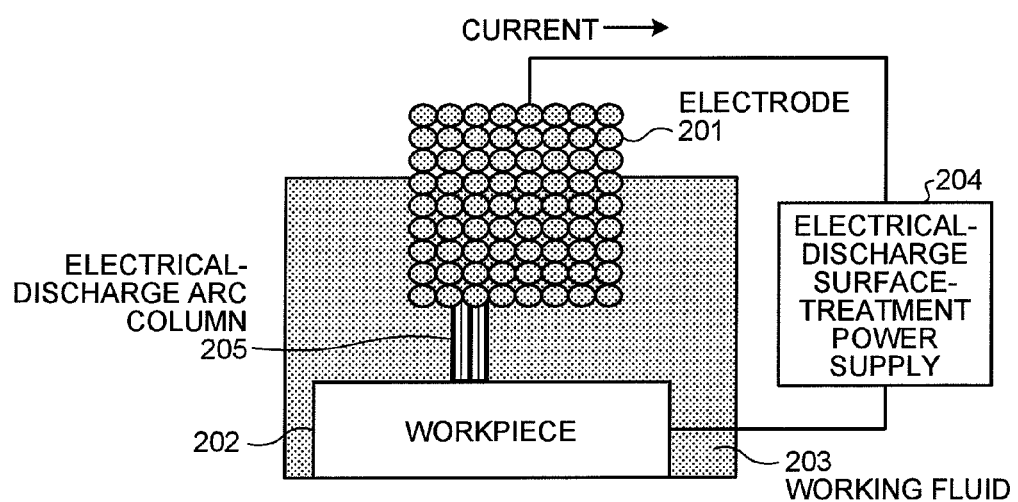
FIG. 2 is a schematic diagram of a configuration of relevant parts of an electrical discharge surface treatment apparatus for performing electrical discharge surface treatment using a green compact electrode.

FIG. 2 is a schematic diagram of a configuration of integral parts of an electrical discharge surface treatment apparatus for performing electrical discharge surface treatment using a green compact electrode manufactured by the above procedure. As illustrated in FIG. 2, the electrical discharge surface treatment apparatus includes an electrode 201 that is the electrical-discharge surface-treatment electrode made of the green compact described above, an oil as a working fluid 203, an electrical-discharge surface-treatment power supply 204 for applying a voltage between the electrode 201 and a workpiece 202 (a member to be processed) to generate a pulsed electrical discharge (an arc column 205) between the electrode 201 and workpiece 202, and a working fluid supplying unit (not shown) that supplies the working fluid 203 for dipping the electrode 201 and the workpiece 202 in the working fluid 203 or supplies the working fluid 203 between the electrode 201 and the workpiece 202. In FIG. 2, some parts not directly relevant to the present invention, such as a driving unit that controls relative positions of the electrical-discharge surface-treatment power supply 204 and the workpiece 202, are omitted from the drawing.

To form a coating film on a surface of the workpiece 202 by the electrical discharge surface treatment apparatus using the electrode 201, the electrode 201 and the workpiece 202 are arranged facing each other in the working fluid 203, and a pulsed electrical discharge is generated between the electrode 201 and the workpiece 202 by the electrical-discharge surface-treatment power supply 204. The arc column 205 is generated between the electrode 201 and the workpiece 202 by the energy of the electrical discharge, the electrode material of the electrode 201 is broken and discharged, reaching the surface of the workpiece 202. At this time, a part of the electrode material is melted by the energy of the electrical discharge and solidified on the surface of the workpiece 202 to form a coating film or a coating film of a material obtained by a reaction of the electrode material by the energy of the electrical discharge is formed on the surface of the workpiece 202. In terms of polarities, the electrode 201 side uses the negative pole, and the workpiece 202 side uses the positive pole.

To form a dense and thick coating film by the electrical discharge surface treatment, it is required that the amount of supplying the electrode material between the electrodes by the pulsed electrical discharge and the amount of supplying the electrode material to the workpiece 202 be appropriate and the electrode material that is supplied to the workpiece 202 be melted by the pulsed electrical discharge and bonded on the surface of the workpiece 202 in a solid manner.

Figures 1, 3:
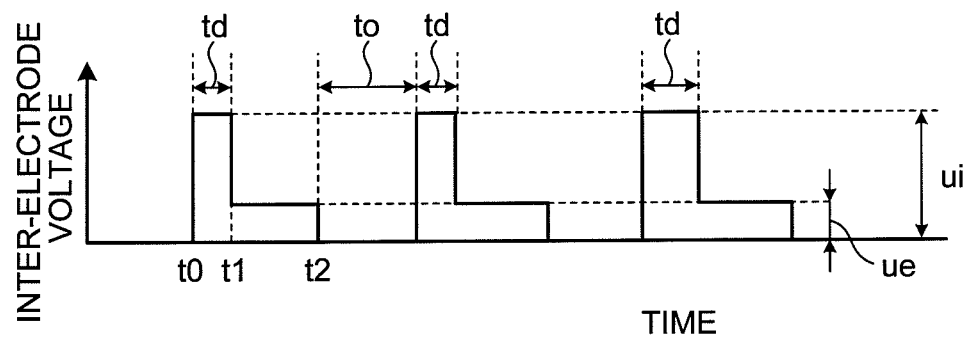
Figures 2, 3:
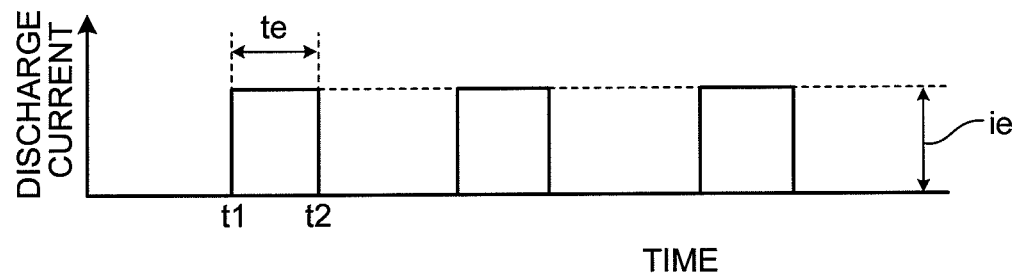

A pulse condition for the electrical discharge when performing the electrical discharge surface treatment is explained below. An example of the pulse condition for performing the electrical discharge surface treatment is illustrated in FIG. 3-1 and FIG. 3-2. FIG. 3-1 and FIG. 3-2 are graphs of an example of the pulse condition for the electrical discharge at the time of the electrical discharge surface treatment, where FIG. 3-1 depicts a voltage waveform of an inter-electrode voltage applied between the electrode 201 and the workpiece 202 at the time of electrical discharge, and FIG. 3-2 depicts a current waveform of a discharge current flowing at the time of the electrical discharge.

As illustrated in FIG. 3-1, a no-load voltage ui is applied between the electrodes at a time t0, after an elapse of a discharge delay time td, at a time t1, a current starts to flow between the electrodes, by which electrical discharge begins. A voltage at the time t1 is a discharge voltage ue, and a current flowing at the time t1 is a peak current ie. Thereafter, if a supply of the voltage between the electrodes is cut off at a time t2, the current stops flowing. A current waveform in this case is, as illustrated in FIG. 3-2, a substantially rectangular waveform.

A time t2-t1 is a discharge duration time (pulse width) te. The voltage waveform for the times t0 to t2 is applied between the electrodes in a repeated manner with an interval time $t_o$. That is, as illustrated in FIG. 3-1, a pulsed voltage is applied between the electrode 201 and the workpiece 202.

Figures 1, 4:
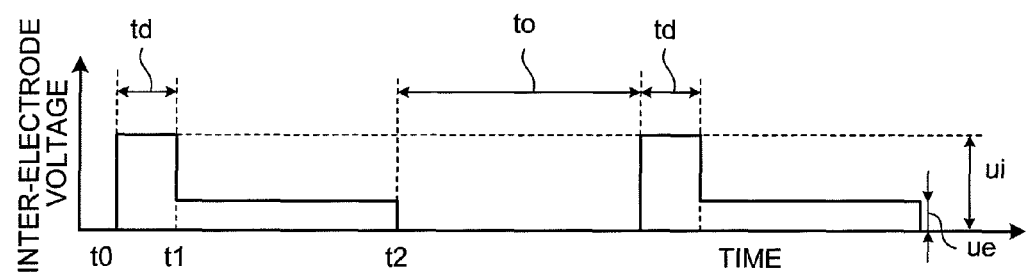
Figures 2, 4:
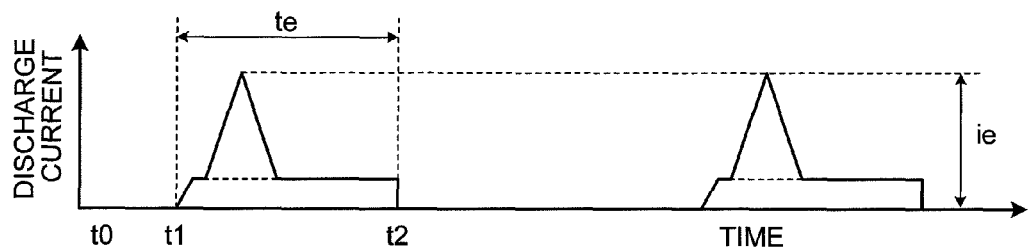

Another example of the pulse condition for the electrical discharge for performing the electrical discharge surface treatment is illustrated in FIG. 4-1 and FIG. 4-2. FIG. 4-1 and FIG. 4-2 are graphs of another example of the pulse condition for the electrical discharge at the time of the electrical discharge surface treatment, where FIG. 4-1 depicts a voltage waveform of an inter-electrode voltage applied between the electrode 201 and the workpiece 202 at the time of electrical discharge, and FIG. 4-2 depicts a current waveform of a discharge current flowing at the time of the electrical discharge.

The current waveform in this pulse condition is, as illustrated in FIG. 4-2, a waveform in which a waveform having a high peak is combined near a leading edge of the substantially rectangular waveform. The current portion of the high peak near the leading edge of the current waveform is a portion for applying a large impact on the electrode 201 at a leading edge of the electrical discharge pulse, breaking the electrode 201, and supplying a large amount of the electrode material to the workpiece 202 side. A current portion of a low current value following the high peak is considered to be a portion for melting the electrode material supplied to the workpiece 202 side. However, it does not mean that the roles are completely separated as described above, but the electrode material supplied to the workpiece 202 side is also melted by the current of the high peak portion near the leading edge. Likewise, the electrode material is also broken by the current of the low current value at a trailing edge side and supplied to the workpiece 202 side.

Figures 1, 5:
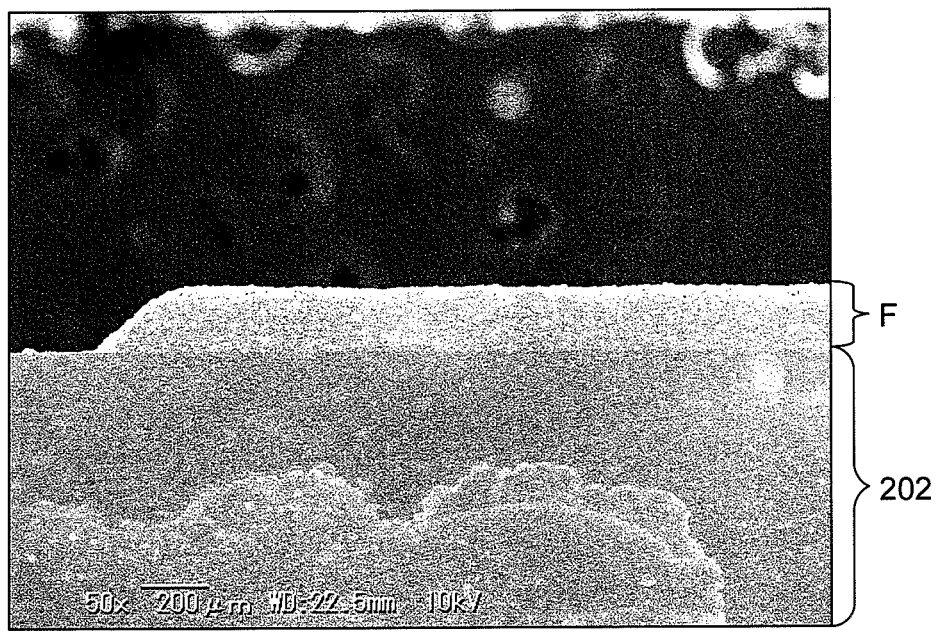
Figures 2, 5:
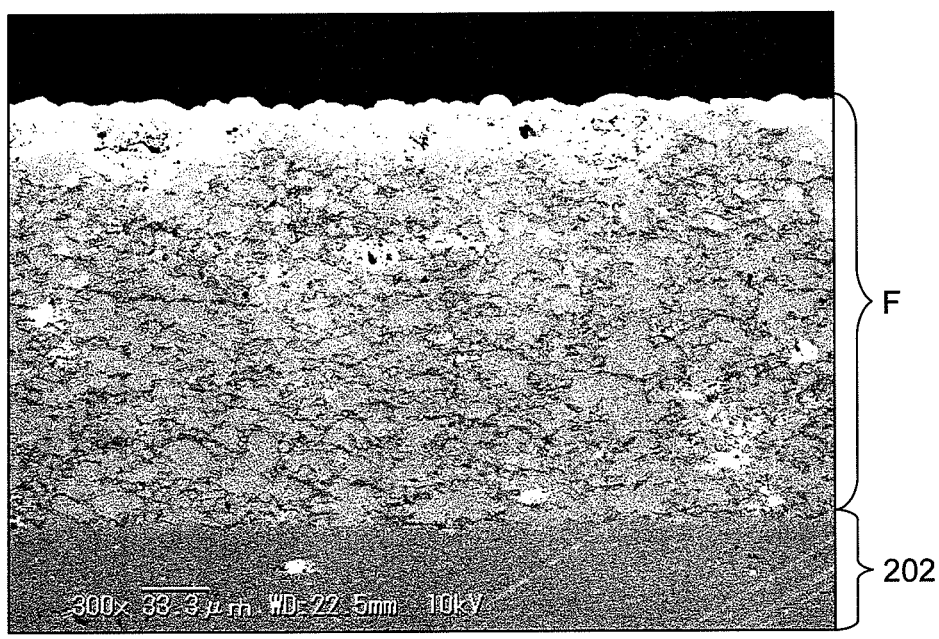
Figures 3, 5:
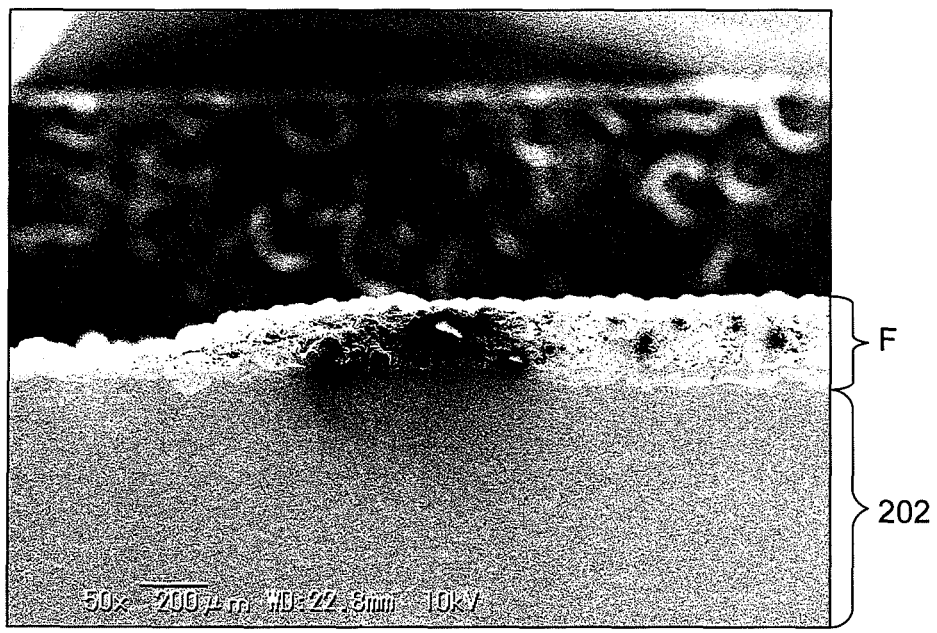
Figures 4, 5:
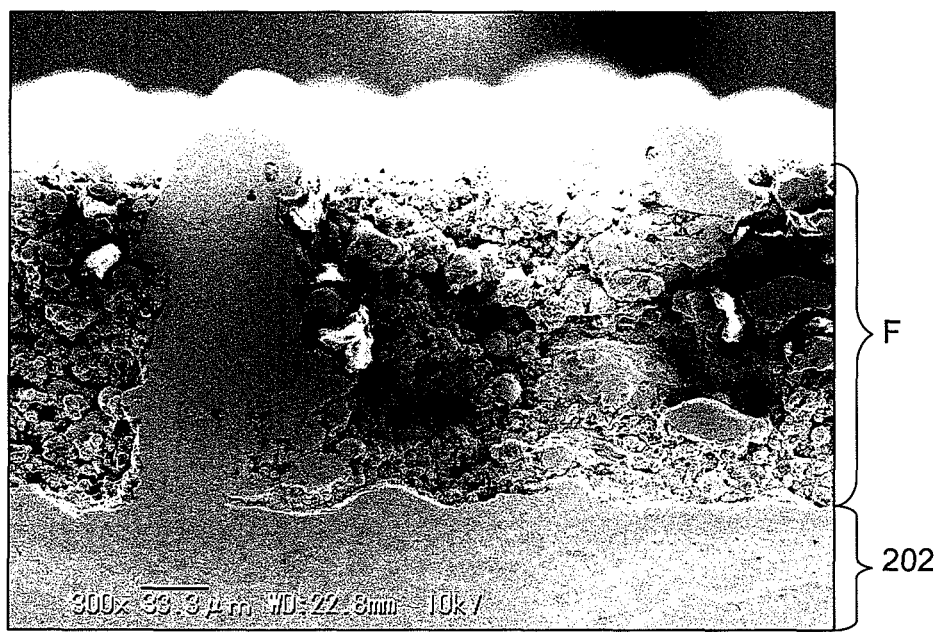
Figure 5:
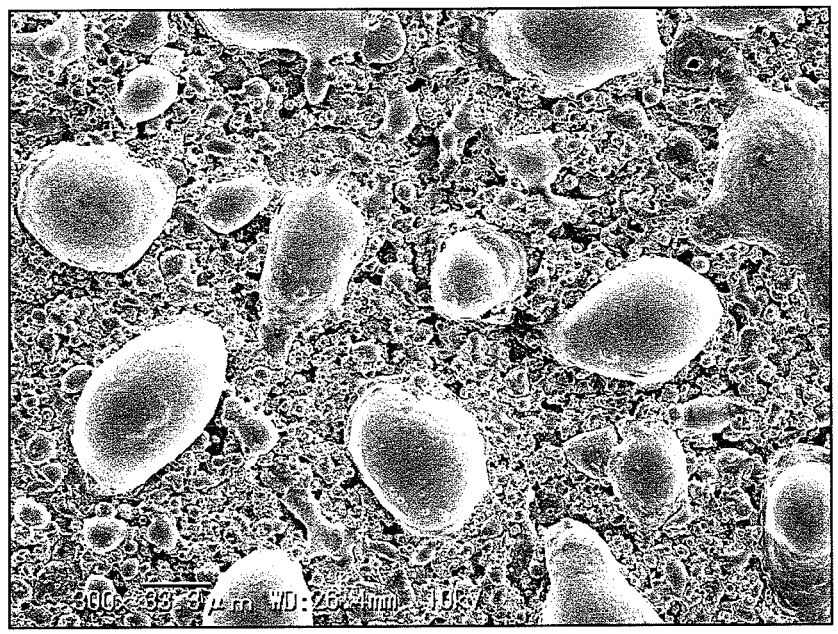

FIG. 5-1 to FIG. 5-5 are images of states of a coating film F formed by performing the electrical discharge surface treatment by changing the pulse width te under the pulse condition for the electrical discharge illustrated in FIG. 4-1 and FIG. 4-2 taken by a scanning electron microscope (SEM), where FIG. 5-1 to FIG. 5-4 are cross-sectional images, and FIG. 5-5 is a surface image. The current value of the high peak near the leading edge in the current waveform of the discharge current illustrated in FIG. 4-2 is set to 30 amperes, and the current value of the low current following the high peak is set to 4 amperes.

FIG. 5-1 and FIG. 5-2 are images of a cross section of the coating film F formed by setting the pulse width of the electrical discharge pulse to 4 microseconds taken by the SEM, where FIG. 5-1 is an image taken with a 50-fold magnification, and FIG. 5-2 is an image taken with a 300-fold magnification. When the pulse width te is as short as just described, because units of supplying the electrode material to the workpiece 202 side and melting the electrode material are small, the overall coating film F seems uniform in a macro scale. However, discontinuous portions in units of melting, that is, portions in which bonding states are considered to be weak at boundaries of portions in which the electrode material supplied to the workpiece 202 side by the pulsed electrical discharge exist across the entire coating film, so that the strength of the coating film is weak.

With an increase of the pulse width te of the electrical discharge pulse, the units of melting the electrode material supplied to the workpiece 202 side increase, and from a certain point, the coating film becomes a texture in which a melted portion grows in a columnar shape, not a fully uniform coating film. For example, FIG. 5-3 and FIG. 5-4 are images of the cross section of the coating film F formed by setting the pulse width of the electrical discharge pulse to 64 microseconds taken by an SEM, where FIG. 5-3 is an image taken at 50-fold magnification, and FIG. 5-4 is an image taken at 300-fold magnification. FIG. 5-5 is a surface image of the coating film F formed by setting the pulse width of the electrical discharge pulse to 64 microseconds taken by the SEM at 300-fold magnification.

As may be understood from these cross-sectional images, with an increase of the pulse width te of the electrical discharge pulse, the melted portion of the electrode material supplied to the workpiece 202 side extends in a columnar shape, and a portion of a particle shape that is not sufficiently melted or a void exists between columns. It is considered that the reason why the coating film becomes the texture of such a state when the pulse width te is long is that the electrode material supplied to the coating film side is melted for a long time with a long pulse so that the sufficiently melted material is solidified in a state where it is swollen by a surface tension as illustrated in FIG. 5-5, and when electrical discharge is generated again nearby, the electrical discharge occurs on the swollen portion. Therefore, when the texture of the columnar shape is formed, it becomes a texture in which a portion of a high bonding strength with the electrode material supplied to the workpiece 202 side sufficiently melted and a portion in which the heat is not applied sufficiently between portions of the high bonding strength are mixed. Because this texture has a high bonding strength in a portion that is sufficiently melted but a low bonding strength in a portion that is not melted, the overall coating film is a texture having defects.

Figures 1, 6:
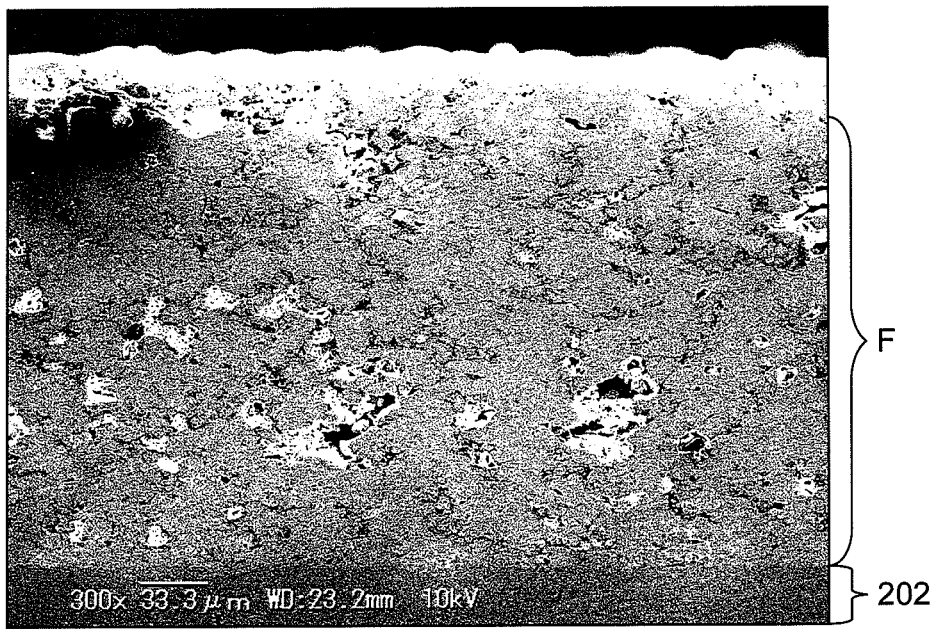
Figures 2, 6:
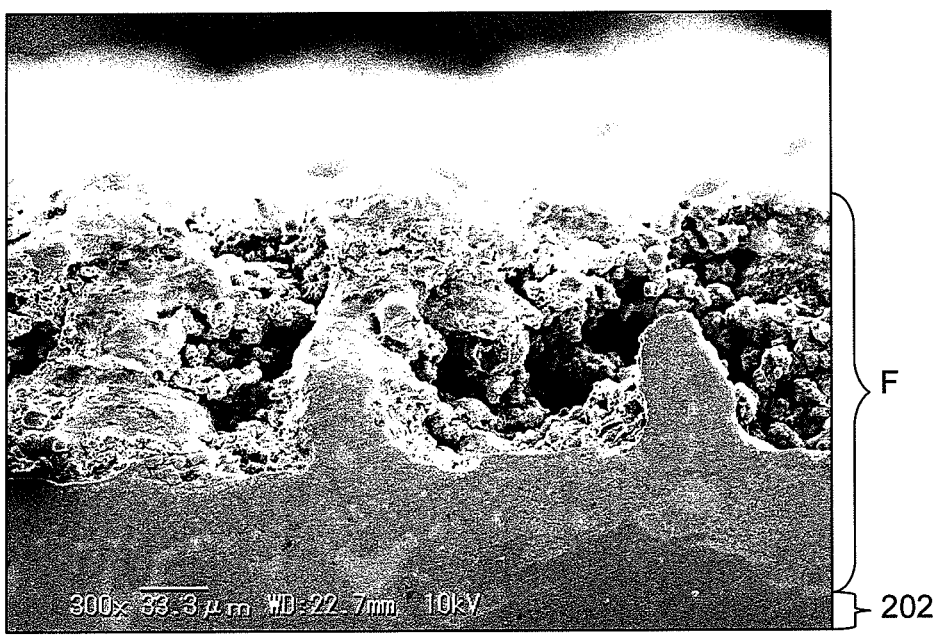

FIG. 6-1 and FIG. 6-2 are images of cross sections of the coating film F formed by changing the pulse width te under the pulse condition for the electrical discharge illustrated in FIG. 3-1 and FIG. 3-2 taken by an SEM, where FIG. 6-1 is a cross-sectional image when the pulse width te of the discharge pulse is set to 4 microseconds, and FIG. 6-2 is a cross-sectional image when the pulse width te of the discharge pulse is set to 64 microseconds. The magnification is 300-fold for both cases. As may be understood from the images of FIG. 6-1 and FIG. 6-2, under a condition in which the pulse width te is short, an effect of the leading edge portion conspicuously appears, and as the pulse width te increases, a difference from a portion of the rectangular waveform illustrated in FIG. 4-1 and FIG. 4-2 decreases.

In the cases of both the pulse condition for the electrical discharge illustrated in FIG. 3-1 and FIG. 3-2 and the pulse condition for the electrical discharge illustrated in FIG. 4-1 and FIG. 4-2, a pulse with a short pulse width te and a small electrical discharge energy produces a coating film that is uniform but with a weak bonding strength. The reason for the weak bonding strength is because an injection of the energy is small, so that the coating material, that is, the electrode material supplied to the workpiece 202, is not sufficiently melted. On the other hand, under a condition in which the pulse width te is long, the coating film becomes a columnar shape, in which the portion of the columnar shape becomes a state of a strong bonding strength and a portion between the columnar-shaped portions is not melted and becomes a state of a weak bonding strength. Both the states are defective as the coating film, which do not make good states.

In the present invention, it is realized to form a dense and thick coating film having both a uniform state and a strong bonding strength in a stable manner.

As explained above, with a pulse having a short pulse width te and a small energy, a coating film which is uniform but with a weak bonding strength is formed. The reason for the weak bonding strength is because an injection amount of the energy by the electrical discharge into the coating material, that is, the electrode material supplied to the workpiece 202 is small, so that the coating material is not sufficiently melted.

On the other hand, the reason why the texture of the columnar shape is formed when forming the coating film under a condition that the pulse width te is large is because a portion in which the electrode material supplied to the workpiece 202 is melted becomes a state where the next electrical discharge is easily generated, and the electrical discharge hardly occurs in a portion in which the electrical discharge is not generated between melted portions, so that there occurs an uneven distribution of the electrical discharge. Therefore, to avoid a texture of an uneven columnar shape, it is required to prevent the uneven distribution of the electrical discharge. If the uneven distribution of the electrical discharge can be prevented, it is possible to better melt the coating material, so that a strong coating film may be formed.

Figures 1, 7:
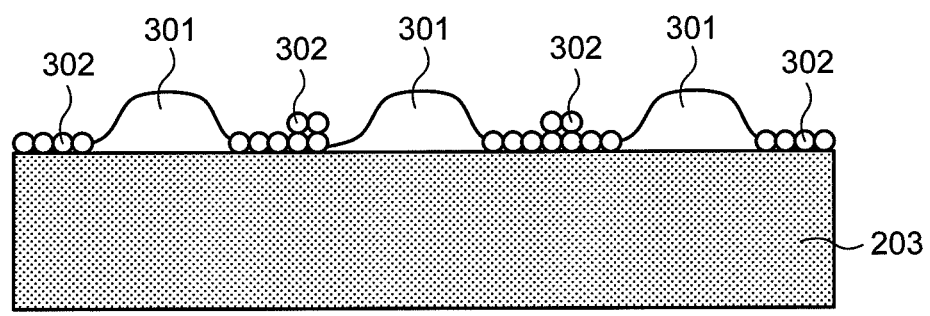
Figures 2, 7:
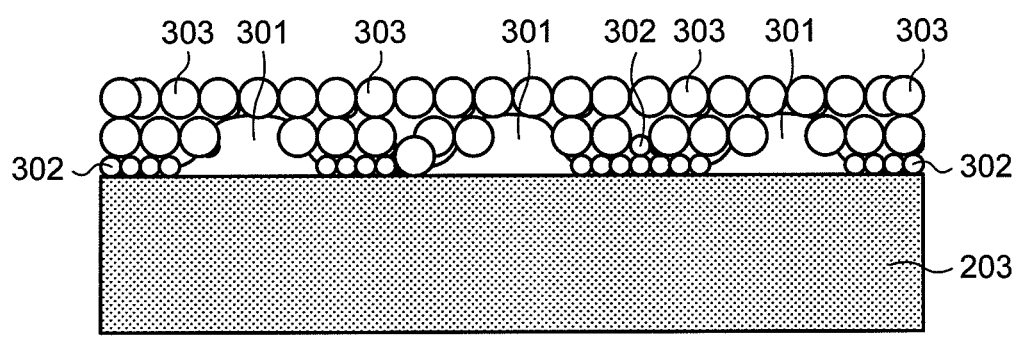

In the present invention, a coating film is formed with electrical discharge by a pulse under a condition that the pulse width te is long for forming a better melted coating film (large pulse), and a supply of the material is performed by a pulse for distributing the electrical discharge, that is, a pulse under a condition that the pulse width te is short for preventing the uneven distribution of the electrical discharge (small pulse). A mechanism for forming a coating film by the electrical discharge surface treatment method according to the present invention is explained below with reference to FIG. 7-1 and FIG. 7-2. FIG. 7-1 and FIG. 7-2 are schematic diagrams for explaining a mechanism for forming a coating film by the electrical discharge surface treatment method according to a first embodiment.

FIG. 7-1 depicts an intermediate stage of forming the coating film, and depicting a state of the coating film when the electrical discharge is generated for a short time by a main pulse that is a pulse with a long pulse width te. The short time means "before a film of a large number of layers is formed by a repeated generation of the electrical discharge", which is a time equal to or shorter than a time for forming a film of a few layers. As illustrated in FIG. 7-1, two portions are formed in the coating film as follows. The first portion is a first electrical discharge mark portion 301 that is a main melted portion (an electrical discharge mark) formed by melting the electrode material supplied within an area of an arc column of the electrical discharge. The second portion is a second electrical discharge mark portion 302 that is distributed around the main melted portion, in which the electrode material is supplied but is not sufficiently melted as the main melted portion. In the second electrical discharge mark portion 302, a deposit of a particle shape that is not sufficiently melted is formed.

Also in the second electrical discharge mark portion 302, it is considered that the electrode material is melted but not just supplied as it is without being melted at all, because a size of a particle of the deposit is larger than a particle diameter of the material that forms the electrode. The first electrical discharge mark portion 301 that is the main melted portion tends to swell in a rounded shape by a surface tension because it is sufficiently melted. When the electrical discharge is generated a plurality of times, the first electrical discharge mark portion 301 becomes a convex shape compared to the second electrical discharge mark portion 302 that is not sufficiently melted around the first electrical discharge mark portion 301, and if the electrical discharge is continued, the first electrical discharge mark portion 301 becomes a state that easily induces the electrical discharge.

Before running into such a state, if the electrical discharge is generated by the pulse with the short pulse width te, as illustrated in FIG. 7-2, it is possible to cover the convex-shaped portion (the first electrical discharge mark portion 301) that is formed by the electrical discharge by the pulse with the long pulse width te. In this state, the convex-shaped portion (the first electrical discharge mark portion 301) formed in the state illustrated in FIG. 7-1 becomes invisible. Therefore, even when the electrical discharge is generated again by the pulse with the long pulse with te, the electrical discharge is not unevenly distributed on the first electrical discharge mark portion 301 that is the main melted portion, and the electrical discharge may be easily generated with the same provability on every portions, so that it is possible to form a coating film that is better melted in a uniform manner.

Figure 8:
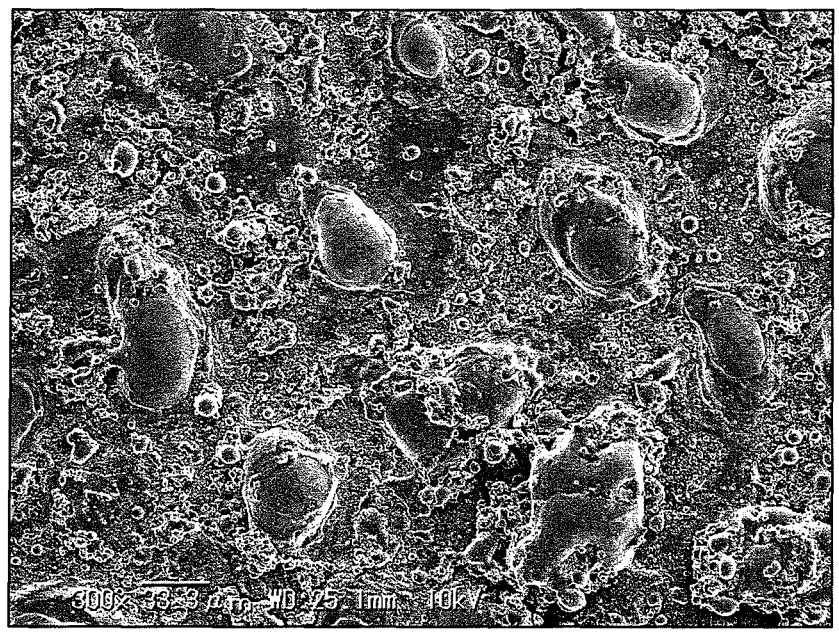
FIG. 8 is a surface image of a state of a coating film when electrical discharge is generated by a pulse with a long pulse width te, taken by an SEM.
Figure 9:
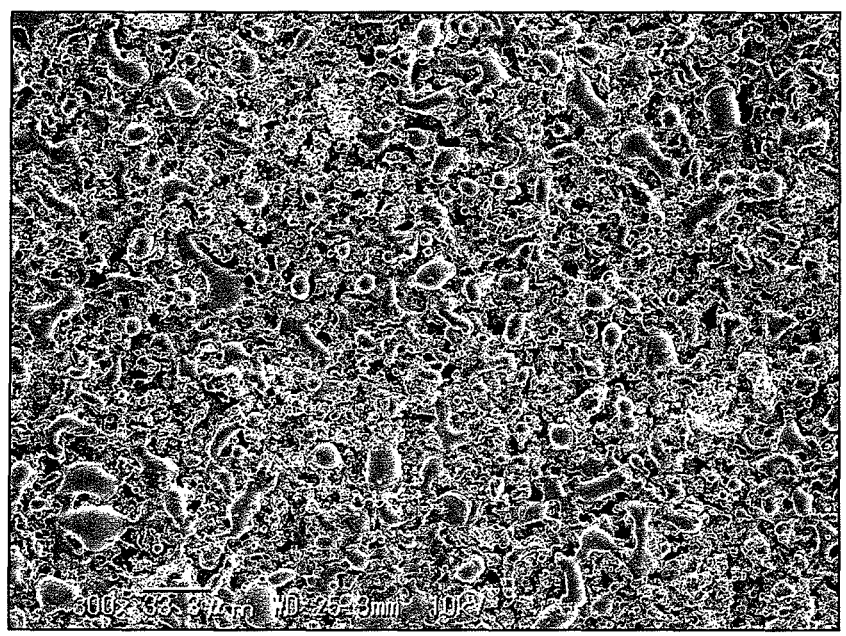
FIG. 9 is a surface image of a state of a coating film when electrical discharge is generated by a pulse with a short pulse width te after generating the electrical discharge by the pulse with the long pulse width te, taken by the SEM.

FIG. 8 is a surface image of a state of a coating film when electrical discharge is generated by a pulse with the long pulse width te, taken by an SEM. FIG. 9 is a surface image of a state of a coating film when electrical discharge is generated by a pulse with the short pulse width te after generating the electrical discharge by the pulse with the long pulse width te, taken by an SEM. The magnification is 300-fold for both cases.

Figures 1, 10:
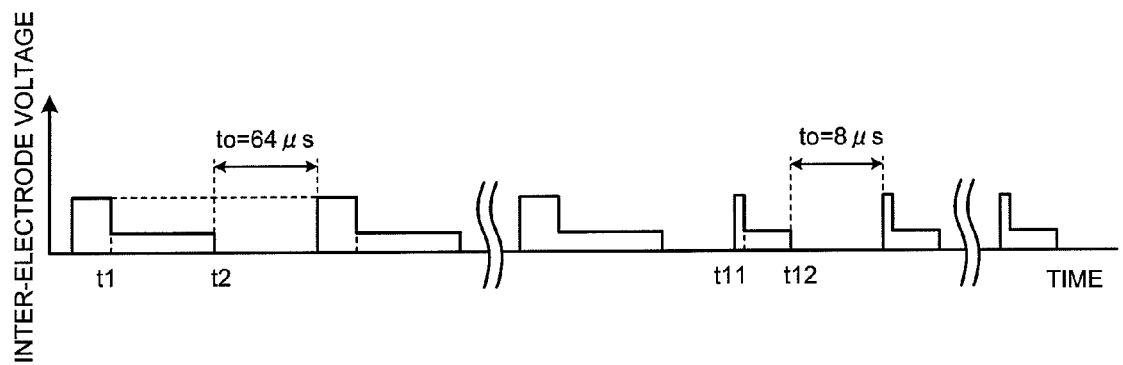
Figures 2, 10:
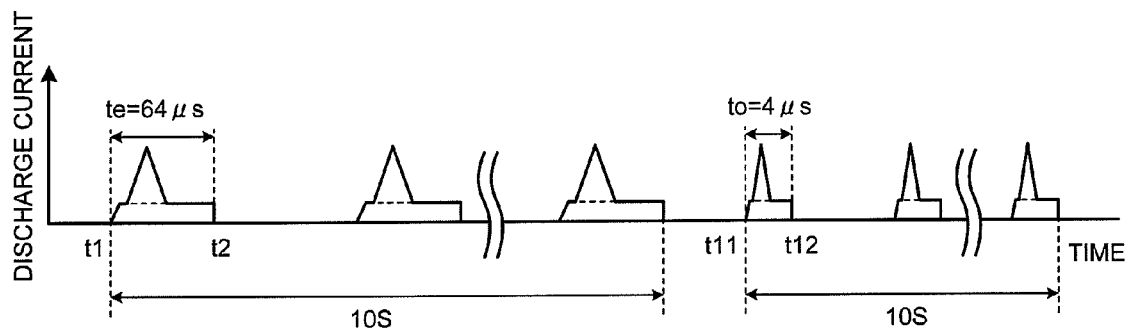

A condition for the long pulse width te is 64 microseconds with a pause time of 64 microseconds, and a condition for the short pulse width te is 4 microseconds with a pause time of 8 microseconds. As illustrated in FIG. 10-1 and FIG. 10-2, the electrical discharge is generated for 10 seconds under the condition of the long pulse width te, and thereafter the electrical discharge is generated for 10 seconds under the condition of the short pulse width te. A coating film is then formed by the electrical discharge surface treatment by periodically alternating the electrical discharge by the pulse with the long pulse width te and the electrical discharge by the pulse with the short pulse width te.

As a result, as may be understood from FIG. 9, it is possible to cover the convex-shaped portion with the coating material (electrode material) by generating the electrical discharge by the pulse with the short pulse width after generating the electrical discharge by the pulse with the long pulse width te.

Figure 11:
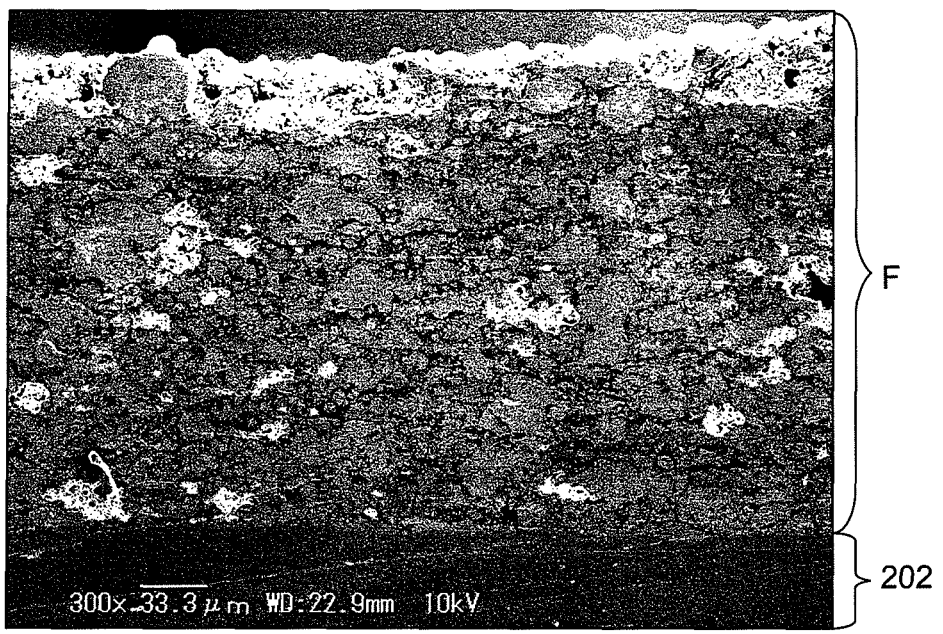
FIG. 11 is a cross-sectional image of a state of a coating film taken by an SEM.

As explained above, by adopting a pulse condition for the electrical discharge in which the long pulse width te and the short pulse width te are mixed and repeating the electrical discharge by the pulse with the long pulse width te and the electrical discharge by the pulse with the short pulse width te in an alternate manner, it is possible to prevent an uneven distribution of the electrical discharge that is characteristic to the electrical discharge by the pulse with the long pulse width te, and it is possible to form a dense coating film. FIG. 11 is a cross-sectional image of the coating film F formed by the method according to the present embodiment taken by the SEM, with the magnification of 300-fold. As may be understood from FIG. 11, there exists no columnar-shaped portion in the coating film F formed by the method according to the present embodiment, making a coating film that is uniform with most melted portions.

Figures 1, 12:
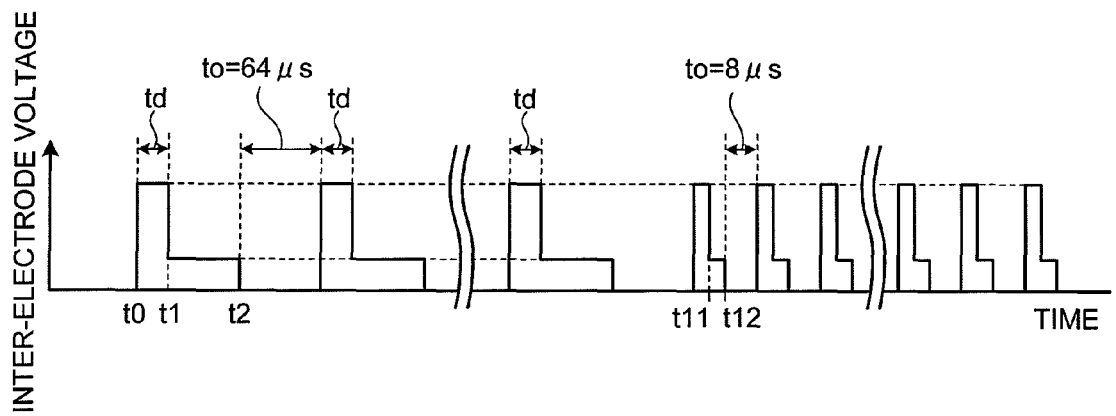
Figures 2, 12:
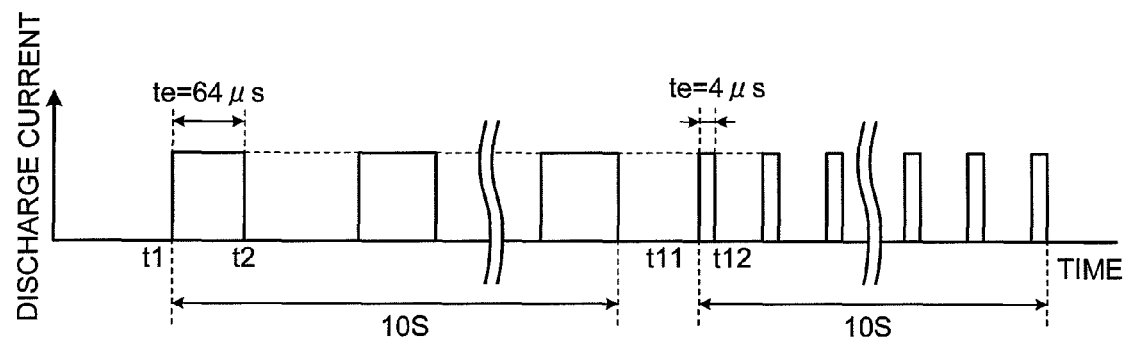

Although the pulse condition for the electrical discharge adopted in the present embodiment is a condition having a high peak at a leading edge of a current waveform illustrated in FIG. 10-1 and FIG. 10-2, it is not limited to the above described condition. It is also possible to obtain the same effect by adopting the discharge pulse of the rectangular current waveform illustrated in FIG. 3-1 and FIG. 3-2 for the discharge pulse of the long pulse width te and the discharge pulse of the short pulse width te as illustrated in FIG. 12-1 and FIG. 12-2. Furthermore, a combination of the pulse condition for the electrical discharge illustrated in FIG. 3-1 and FIG. 3-2 and the pulse condition for the electrical discharge illustrated in FIG. 4-1 and FIG. 4-2 may also be employed.

However, the pulse condition for the electrical discharge illustrated in FIG. 10-1 and FIG. 10-2 has an advantage in that a processing speed is high because a rate of supplying the electrode material to the workpiece 202 is high. In addition, because the pulse condition for the electrical discharge illustrated in FIG. 10-1 and FIG. 10-2 has a better performance of breaking the electrode and supplying the electrode material to the workpiece 202 side, it is possible to form the coating film even when the electrode is strong and robust. Under the pulse condition for the electrical discharge illustrated in FIG. 12-1 and FIG. 12-2, it is not possible to sufficiently break the electrode when the electrode is strong and robust, so that formation of the coating film may not be performed properly.

Furthermore, when generating two or more types of pulsed electrical discharge having different energies from each other by two or more types of different pulses, it is preferable to make a combination of the discharge pulse of the long pulse width te and the discharge pulse of the short pulse width te in such a manner that a diameter of an unmelted particle of the second electrical discharge mark portion 302 that is formed by the discharge pulse of the long pulse width te and not sufficiently melted becomes equal to or smaller than a size of an electrical discharge mark (an unmelted particle) obtained by the discharge pulse of the short pulse width te. By the above described combination, it is possible to cover the convex-shaped portion (the first electrical discharge mark portion 301) with the electrical discharge mark (an unmelted particle) obtained by the discharge pulse of the short pulse width te in a reliable manner, making it possible to prevent the uneven distribution of the electrical discharge that is a characteristic aspect of the electrical discharge by the discharge pulse of the long pulse width te, and as a result, it is possible to form a dense coating film.

In addition, although a case where 4 microseconds and 64 microseconds are used as the pulse width te has been explained above, the pulse width te is not limited to those values, but it is preferable to set a condition for the long pulse width te to, for example, equal to or longer than 50 microseconds and equal to or shorter than 500 microseconds. When the long pulse width te is shorter than 50 microseconds, there is a possibility that the electrode material is not sufficiently broken and supplied to the workpiece 202. When the long pulse width te is longer than 500 microseconds, the electrode material is excessively supplied to the workpiece 202, so that the electrode material may not be sufficiently melted.

Moreover, it is preferable to set a condition for the short pulse width te to equal to or longer than 2 microseconds and equal to or shorter than 20 microseconds, for example. When the short pulse width te is shorter than 2 microseconds, there is a possibility that the electrode material supplied to the workpiece 202 is not sufficiently melted. When the short pulse width te is longer than 20 microseconds, formation of the columnar-shaped texture may not be sufficiently prevented.

Although the time of a cycle for which the pulse of the long pulse width te is generated in a successive manner and the time of a cycle for which the pulse of the short pulse width te is generated in a successive manner, that is, a period for alternating the pulse of the long pulse width te and the pulse of the short pulse width te, is set to 10 seconds in the above descriptions, the time of the cycle is not limited to 10 seconds, but the effect described above may be obtained in a range from a time for several electrical discharges to several tens of seconds. It is preferable to set the time of the cycle to, for example, 10 milliseconds to 20 seconds. By setting the cycle to a time within the above described range, it is possible to obtain the effect described above in a reliable manner.

As described above, with the electrical discharge surface treatment method according to the present embodiment, it is possible to form a dense and thick coating film that is uniform with a strong bonding strength in a stable manner.

Second Embodiment

In the first embodiment, although it is explained that a uniform and dense coating film may be formed by using a combination of a pulsed electrical discharge with a long pulse width te and a pulsed electrical discharge with a short pulse width te, it has been found that the density of the coating film is influenced by the method of alternating these pulsed electrical discharges from researches conducted by the present inventors.

Figures 1, 13:
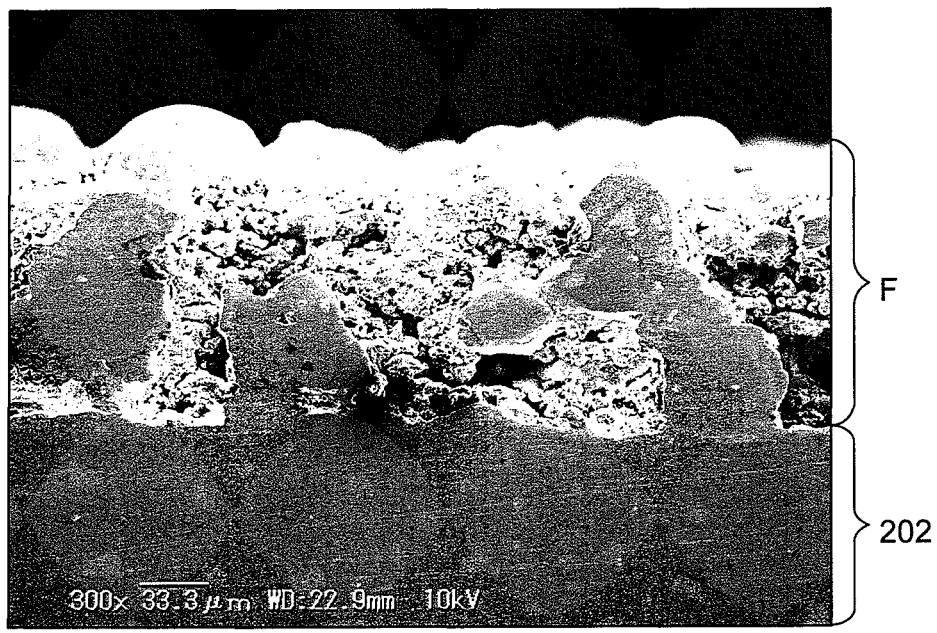
Figures 2, 13:
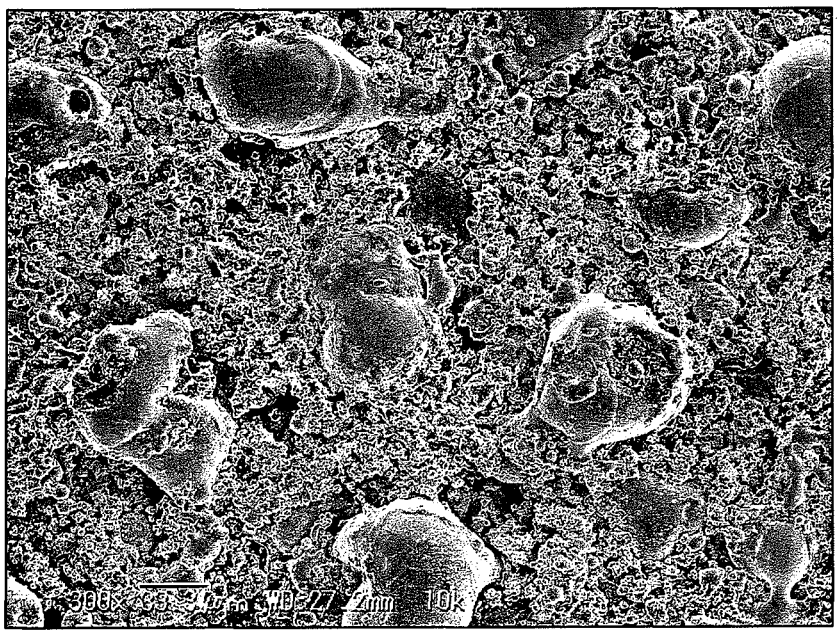

When a ratio of the pulse of the long pulse width te is higher than that of an optimum case, a phenomenon appears in which the convex-shaped portion of the coating surface formed by the electrical discharge by the pulse of the long pulse width te may not be sufficiently covered by the electrical discharge by the pulse of the short pulse width te, so that the uneven distribution of the electrical discharge may not be sufficiently eliminated. FIG. 13-1 and FIG. 13-2 are images of a state of a coating film F formed by setting the ratio of the electrical discharge with the long pulse width te to a double the ratio in the first embodiment that is in an appropriate range, taken by an SEM, where FIG. 13-1 is an image of a cross section of the coating film F, and FIG. 13-2 is an image of a surface of the coating film F. The magnification is 300-fold for both cases.

As may be understood from FIG. 13-1, although the coating film is more uniform than a coating film that is formed by a pulsed electrical discharge with all long pulse width te, so that the texture does not show columnar shapes extending in a straight manner, it still shows a state where the texture is becoming a columnar shape. Furthermore, as may be understood from FIG. 13-2, even though the process is lastly finished with the pulsed electrical discharge with the short pulse width te, a convex-shaped portion formed by the pulsed electrical discharge with the long pulse width te, that is, a portion that is melted in a round shape, appears on the surface of the coating film F. This shows that the coating film F is not sufficiently flattened because the ratio of the electrical discharge with the short pulse width te is low, so that the electrical discharge tends to occur on a place where the electrical discharge with the long pulse width te has been generated before.

As is clear from the above descriptions, there is a range of an appropriate condition for the ratio of the pulsed electrical discharge with the long pulse width te and the pulsed electrical discharge with the short pulse width te. It is preferable to continue the pulsed electrical discharge with the short pulse width te for a time for which the convex-shaped portion formed by the pulsed electrical discharge with the long pulse width te is covered by the coating film formed by the pulsed electrical discharge with the short pulsed width te. When the ratio of the pulsed electrical discharge with the short pulse width te is too high, the coating film may not be sufficiently melted by the pulsed electrical discharge with the long pulse width te, so that it becomes a coating film that is close to a coating film formed only by the pulsed electrical discharge with the short pulse width te.

From the above descriptions, it is preferable to perform a switching of the optimum pulse condition for the pulse electrical discharge with the long pulse width te and the pulsed electrical discharge with the short pulse width te in such a manner that the pulsed electrical discharge with the long pulse width te is performed again at a timing at which the convex-shaped portion (the electrical discharge mark) formed by the pulsed electrical discharge with the long pulse width te is just covered by the pulsed electrical discharge with the short pulse width te.

Third Embodiment

In the second embodiment, the timing for switching the pulsed electrical discharge with the long pulse width te and the pulsed electrical discharge with the short pulse width te has been explained from a point of view of covering the convex-shaped portion (the electrical discharge mark). However, the pulsed electrical discharge with the long pulse width te and the pulsed electrical discharge with the short pulse width te may be switched from a viewpoint of an area for performing the process. That is, as the area of forming the coating film by the electrical discharge surface treatment increases, the time of a cycle may be increased for each of the cycle of the pulsed electrical discharge by the long pulse width te and the cycle of the pulsed electrical discharge with the short pulse width te. On the other hand, when the area of forming the coating film is small, the timing for switching the pulsed electrical discharge needs to be shortened.

When the area of forming the coating film is small, if the cycle of each of the pulsed electrical discharge with the long pulse width te and the pulsed electrical discharge with the short pulse width te is long, that is, the formation of the coating film under the same pulse condition for the electrical discharge is continued for a long time, because a deposition speed of the coating film increases, the coating film is formed in such a manner that a coating film formed by the pulsed electrical discharge with the long pulse width te and a coating film formed by the pulsed electrical discharge with the short pulse width te are separated from each other without being mixed. On the other hand, when the cycle of each of the pulsed electrical discharge with the long pulse width te and the pulsed electrical discharge with the short pulse width te is short, that is, the formation of the coating film under the same pulse condition for the electrical discharge is not continued for a long time, normally, there is no serious problem. This is because the electrical discharge occurs at close locations in a successive manner, so that, when the cycle of each of the electrical discharges is short, the pulsed electrical discharge with the long pulse width te and the pulsed electrical discharge with the short pulse width te are mixed with each other. When the electrical discharge occurs, a plasma is generated at a location of an arc column so that the electrical discharge is easy to occur near the location of the arc column, and particles of the electrode material emitted by the occurrence of the electrical discharge stay around the location of the electrical discharge so that the next electrical discharge is induced, which is the reason why locations of successive electrical discharges gather nearby.

Therefore, for forming a uniform and dense coating film, it is effective to adjust the timing for switching the pulsed electrical discharge with the long pulse width te and the pulsed electrical discharge with the short pulse width te according to the area of forming the coating film by the electrical discharge surface treatment.

Fourth Embodiment

It is possible to choose a better condition for a combination of pulsed electrical discharges for obtaining a dense coating film by considering the following aspects. When the pulsed electrical discharge with the long pulse width te occurs, the first electrical discharge mark portion 301 that is the main melted portion and the second electrical discharge mark portion 302 that is distributed around the main melted portion, which is a deposition of particles that are not sufficiently melted are formed as described above. The particle-shaped deposits of the second electrical discharge mark portion 302 are particles that may be melted if the electrical discharge is generated at their locations.

Figure 14:
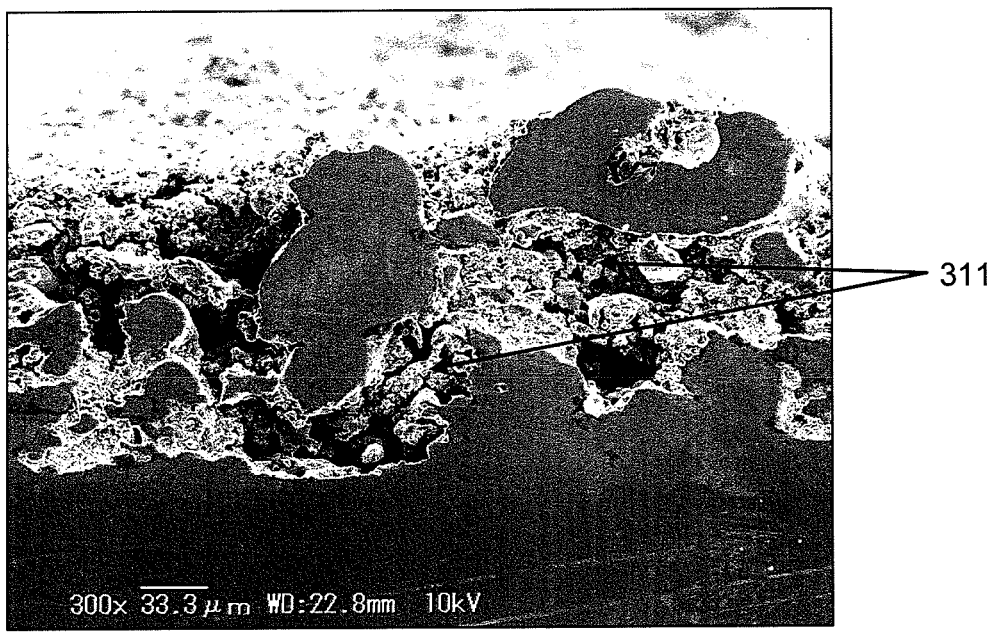
FIG. 14 is a cross-sectional image of a state of a coating film taken by an SEM.

However, when a unit of melting by the pulsed electrical discharge with the short pulse width te for covering the convex-shaped portion formed on the surface of the coating film by the pulsed electrical discharge with the long pulse width te is considerably larger than a size of a particle deposited on the second electrical discharge mark portion 302 that is not sufficiently melted by the pulsed electrical discharge with the long pulse width te, as illustrated in FIG. 14, it may not be sufficiently melted by the next pulsed electrical discharge with the long pulse width te, and thus a particle 311 not melted may remain.

To prevent such a phenomenon, it is preferable to choose a combination of the pulsed electrical discharge with the long pulse width te and the pulsed electrical discharge with the short pulse width te in such a manner that a size of a main melted portion by the pulsed electrical discharge with the short pulse width te becomes equal to or smaller than a size of a particle that is not sufficiently melted by the pulsed electrical discharge with the long pulse width te. With above described combination, it is possible to form a uniform and dense coating film by preventing the particle 311 that is not melted as illustrated in FIG. 14 from remaining.

INDUSTRIAL APPLICABILITY

As described above, the electrical discharge surface treatment method according to the present invention is useful for forming a uniform and dense coating film by electrical discharge surface treatment.

The invention claimed is:

1. An electrical discharge surface treatment method for forming a coating film by generating a pulsed electrical discharge between an electrode and a workpiece in working fluid or gas using a green compact obtained by molding metal powder or metal alloy powder or a molded body obtained by heating the green compact as the electrode, and by melting an electrode material by an energy of the pulsed electrical discharge, forming a coating of the electrode material or a coating of a material obtained by a reaction of the electrode material by the energy of the pulsed electrical discharge on a surface of the workpiece, the electrical discharge surface treatment method comprising generating the pulsed electrical discharge by mixing together two or more types of pulsed electrical discharges, wherein each of the two or more types of pulsed electrical discharges has different energies from each other, and wherein the two or more types of pulsed electrical discharges comprise:
  a first pulsed electrical discharge comprising a plurality of first pulses each pulse having a first pulse width and a plurality of first pause times, each first pause time having a predetermined length, between the plurality of first pulses; and
  a second pulsed electrical discharge comprising a plurality of second pulses each pulse having a second pulse width shorter than the first pulse width and a plurality of second pause times, shorter than the first pause times, between the plurality of second pulses, wherein
the first pulsed electrical discharge and the second pulsed electrical discharge are repeatedly periodically alternated for processing said workpiece, each pulsed electrical discharge having a predetermined length of time, between the electrode and the workpiece.

2. The electrical discharge surface treatment method according to claim 1, wherein the metal alloy contains equal to or more than 40 volume % of a metal material whose Gibbs free energy, for forming carbide, is equal to that of Cr or higher in an Ellingham diagram at a specific temperature.

3. The electrical discharge surface treatment method according to claim 2, wherein
the metal material whose Gibbs free energy, for forming carbide, is equal to that of Cr or higher in the Ellingham diagram at a specific temperature includes Co (cobalt), Ni (nickel), Fe (iron), W (tungsten), and Mo (molybdenum).

4. The electrical discharge surface treatment method according to claim 1, wherein the pulsed electrical discharge is generated by mixing together the first pulsed electrical discharge with a pulse width equal to or longer than 50 microseconds and the second pulsed electrical discharge with a pulse width equal to or shorter than 20 microseconds.

5. The electrical discharge surface treatment method according to claim 1, wherein the first pulsed electrical discharge and the second pulsed electrical discharge are generated in said alternate manner with a predetermined cycle.

6. The electrical discharge surface treatment method according to claim 5, wherein the cycle is 10 milliseconds to 20 seconds.

7. The electrical discharge surface treatment method according to claim 5, wherein the cycle is changed according to an area of forming the coating film.

8. The electrical discharge surface treatment method according to claim 1, wherein the second pulsed electrical discharge is generated in a successive manner until a convex-shaped portion formed by melting the electrode material in a coating film formed by the first pulsed electrical discharge is covered by a coating film formed by the second pulsed electrical discharge.

9. The electrical discharge surface treatment method according to claim 1, wherein a particle diameter of particles distributed around a convex-shaped portion formed by melting the electrode material in a coating film formed by the first pulsed electrical discharge is equal to or smaller than a particle diameter of particles in a coating film formed by the second pulsed electrical discharge.

10. The electrical discharge surface treatment method according to claim 1, wherein the pulsed electrical discharge having different energies is generated by mixing together two or more types of pulses having different peak current values from each other.

* * * * *